US009122537B2

(12) United States Patent
Patel et al.

(10) Patent No.: US 9,122,537 B2
(45) Date of Patent: Sep. 1, 2015

(54) BALANCING SERVER LOAD ACCORDING TO AVAILABILITY OF PHYSICAL RESOURCES BASED ON THE DETECTION OF OUT-OF-SEQUENCE PACKETS

(75) Inventors: Alpesh S. Patel, Cary, NC (US); Chris O'Rourke, Apex, NC (US); Mark Albert, Cary, NC (US); Robert A. Mackie, Cary, NC (US); Walter G. Dixon, Fuquay Varina, NC (US)

(73) Assignee: Cisco Technology, Inc., San Jose, CA (US)

( * ) Notice: Subject to any disclaimer, the term of this patent is extended or adjusted under 35 U.S.C. 154(b) by 704 days.

(21) Appl. No.: 12/609,077

(22) Filed: Oct. 30, 2009

(65) Prior Publication Data

US 2011/0106949 A1    May 5, 2011

(51) Int. Cl.
*G06F 9/46* (2006.01)
*G06F 15/173* (2006.01)
(Continued)

(52) U.S. Cl.
CPC .......... *G06F 9/5077* (2013.01); *G06F 9/45558* (2013.01); *G06F 9/5088* (2013.01); *H04L 29/08171* (2013.01); *H04L 29/08189* (2013.01);
(Continued)

(58) Field of Classification Search
CPC ................... H04L 29/08171; H04L 29/08189; H04L 29/08234; H04L 29/08261; H04L 41/046; G06F 9/5088; G06F 9/5077; G06F 9/45558; G06F 2009/4557
USPC ................... 709/226, 221, 224; 718/104, 105
See application file for complete search history.

(56) References Cited

U.S. PATENT DOCUMENTS 6,070,199 A * 5/2000 Axtman et al. .................... 710/1
6,092,178 A    7/2000 Jindal et al.
(Continued)

FOREIGN PATENT DOCUMENTS

CN    1280753 C    10/2004
CN    1645330         1/2005
(Continued)

OTHER PUBLICATIONS

Gmach, Daniel, et al., "*Satisfying Service Level Objectives in a Self-Managing Resource Pool*", 2009 Third IEEE International Conference on Self-Adaptive and Self-Organizing Systems, IEEE Computer Society, pp. 243-253, Sep. 14, 2009.
(Continued)

*Primary Examiner* — Daniel C Murray
(74) *Attorney, Agent, or Firm* — Baker Botts L.L.P.

(57) ABSTRACT

According to one embodiment, availability information describing virtual machines running on physical machines is accessed. The availability information associates each virtual machine with a physical resource used by the virtual machine. Use by the virtual machines is determined from the availability information. Availability of the physical resources is determined according to the use. Server load is balanced according to the availability of the physical resources. According to another embodiment, the following is performed until a load is accommodated: selecting a server having a load that is less than an expansion threshold; loading the server until the expansion threshold is reached; selecting a next server having a load that is less than a next expansion threshold; and loading the next server until the next expansion threshold is reached. Load of a low load server is determined to be below a contraction threshold, and the low load server is drained.

10 Claims, 2 Drawing Sheets

(51) Int. Cl.

| | | |
|---|---|---|
| G06F 15/177 | (2006.01) | |
| G06F 9/50 | (2006.01) | |
| H04L 29/08 | (2006.01) | |
| H04L 12/24 | (2006.01) | |
| G06F 9/455 | (2006.01) | |

(52) U.S. Cl.
CPC .... *H04L 29/08234* (2013.01); *H04L 29/08261* (2013.01); *H04L 41/046* (2013.01); *G06F 2009/4557* (2013.01)

(56) References Cited

U.S. PATENT DOCUMENTS

| | | | |
|---|---|---|---|
| 6,101,616 A | 8/2000 | Joubert et al. | |
| 6,178,448 B1* | 1/2001 | Gray et al. | 709/224 |
| 6,324,177 B1* | 11/2001 | Howes et al. | 370/389 |
| 6,366,558 B1* | 4/2002 | Howes et al. | 370/219 |
| 6,385,643 B1 | 5/2002 | Jacobs et al. | |
| 6,424,621 B1* | 7/2002 | Ramaswamy et al. | 370/230 |
| 6,445,704 B1* | 9/2002 | Howes et al. | 370/392 |
| 6,507,562 B1* | 1/2003 | Kadansky et al. | 370/216 |
| 6,510,164 B1* | 1/2003 | Ramaswamy et al. | 370/466 |
| 6,590,861 B1 | 7/2003 | Vepa et al. | |
| 6,636,983 B1* | 10/2003 | Levi | 714/4.3 |
| 6,728,748 B1* | 4/2004 | Mangipudi et al. | 718/105 |
| 6,802,062 B1* | 10/2004 | Oyamada et al. | 718/1 |
| 6,862,618 B1* | 3/2005 | Gray et al. | 709/224 |
| 6,944,785 B2 | 9/2005 | Gadir et al. | |
| 7,028,094 B2* | 4/2006 | Le et al. | 709/230 |
| 7,039,008 B1* | 5/2006 | Howes et al. | 370/220 |
| 7,062,556 B1* | 6/2006 | Chen et al. | 709/226 |
| 7,099,915 B1* | 8/2006 | Tenereillo et al. | 709/203 |
| 7,124,188 B2* | 10/2006 | Mangipudi et al. | 709/226 |
| 7,127,625 B2* | 10/2006 | Farkas et al. | 713/320 |
| 7,174,379 B2* | 2/2007 | Agarwal et al. | 709/226 |
| 7,203,944 B1* | 4/2007 | van Rietschote et al. | 718/104 |
| 7,231,416 B1* | 6/2007 | Busuioc | 709/202 |
| 7,284,067 B2* | 10/2007 | Leigh | 709/238 |
| 7,327,676 B2* | 2/2008 | Teruhi et al. | 370/230 |
| 7,383,405 B2* | 6/2008 | Vega et al. | 711/162 |
| 7,441,045 B2* | 10/2008 | Skene et al. | 709/241 |
| 7,444,459 B2* | 10/2008 | Johnson | 711/6 |
| 7,461,274 B2 | 12/2008 | Merkin | |
| 7,469,295 B1 | 12/2008 | Gangadharan | |
| 7,490,151 B2 | 2/2009 | Munger et al. | |
| 7,603,670 B1* | 10/2009 | van Rietschote | 718/1 |
| 7,607,129 B2* | 10/2009 | Rosu et al. | 718/1 |
| 7,653,700 B1* | 1/2010 | Bahl et al. | 709/217 |
| 7,716,667 B2* | 5/2010 | van Rietschote et al. | 718/1 |
| 7,730,486 B2* | 6/2010 | Herington | 718/1 |
| 7,814,495 B1* | 10/2010 | Lim et al. | 718/104 |
| 7,844,839 B2* | 11/2010 | Palmer et al. | 713/300 |
| 7,958,210 B2* | 6/2011 | Sakurai et al. | 709/221 |
| 7,984,148 B2* | 7/2011 | Zisapel et al. | 709/226 |
| 7,984,515 B1* | 7/2011 | Patsenker et al. | 726/31 |
| 8,095,929 B1* | 1/2012 | Ji et al. | 718/1 |
| 8,104,033 B2* | 1/2012 | Chiaramonte et al. | 718/1 |
| 8,117,613 B2* | 2/2012 | Uyeda | 718/1 |
| 8,171,124 B2* | 5/2012 | Kondamuru | 709/223 |
| 8,185,893 B2* | 5/2012 | Hyser et al. | 718/1 |
| 8,255,907 B2* | 8/2012 | Chiaramonte et al. | 718/1 |
| 8,260,926 B2* | 9/2012 | Narayana et al. | 709/226 |
| 8,261,282 B1* | 9/2012 | Ponnapur et al. | 718/105 |
| 8,265,973 B2* | 9/2012 | Radhakrishnan | 705/7.11 |
| 8,291,108 B2* | 10/2012 | Raja et al. | 709/238 |
| 8,438,269 B1* | 5/2013 | West, III | 709/224 |
| 8,484,656 B2* | 7/2013 | Raja et al. | 718/105 |
| 8,578,076 B2* | 11/2013 | van der Linden et al. | 710/72 |
| 8,595,337 B2* | 11/2013 | Beppu | 709/221 |
| 8,745,210 B2* | 6/2014 | Sekiguchi | 709/224 |
| 8,799,605 B2* | 8/2014 | Hasegawa | 711/166 |
| 8,831,674 B2* | 9/2014 | Davis et al. | 455/550.1 |
| 8,972,512 B2* | 3/2015 | Mays et al. | 709/206 |
| 2001/0034752 A1* | 10/2001 | Kremien | 709/105 |
| 2002/0078179 A1* | 6/2002 | Okamura et al. | 709/219 |
| 2002/0087611 A1* | 7/2002 | Tanaka et al. | 709/1 |
| 2002/0099753 A1* | 7/2002 | Hardin et al. | 709/1 |
| 2002/0184368 A1* | 12/2002 | Wang | 709/226 |
| 2002/0184373 A1* | 12/2002 | Maes | 709/228 |
| 2003/0028642 A1* | 2/2003 | Agarwal et al. | 709/226 |
| 2003/0158940 A1* | 8/2003 | Leigh | 709/226 |
| 2004/0030790 A1* | 2/2004 | Le et al. | 709/230 |
| 2004/0128670 A1* | 7/2004 | Robinson et al. | 718/1 |
| 2004/0162901 A1* | 8/2004 | Mangipudi et al. | 709/225 |
| 2005/0022203 A1* | 1/2005 | Zisapel et al. | 718/105 |
| 2005/0038890 A1* | 2/2005 | Masuda et al. | 709/224 |
| 2005/0044206 A1* | 2/2005 | Johansson et al. | 709/224 |
| 2005/0060590 A1* | 3/2005 | Bradley et al. | 713/320 |
| 2005/0160424 A1* | 7/2005 | Broussard et al. | 718/1 |
| 2005/0198250 A1* | 9/2005 | Wang | 709/223 |
| 2005/0198303 A1* | 9/2005 | Knauerhase et al. | 709/227 |
| 2005/0243737 A1* | 11/2005 | Dooley et al. | 370/254 |
| 2006/0069761 A1* | 3/2006 | Singh et al. | 709/222 |
| 2006/0195715 A1* | 8/2006 | Herington | 714/4 |
| 2006/0230407 A1* | 10/2006 | Rosu et al. | 718/105 |
| 2006/0271655 A1* | 11/2006 | Yoon et al. | 709/223 |
| 2007/0043860 A1* | 2/2007 | Pabari | 709/224 |
| 2007/0067435 A1* | 3/2007 | Landis et al. | 709/224 |
| 2007/0079308 A1* | 4/2007 | Chiaramonte et al. | 718/1 |
| 2007/0083642 A1* | 4/2007 | Diedrich et al. | 709/224 |
| 2007/0130566 A1* | 6/2007 | van Rietschote et al. | 718/1 |
| 2007/0177523 A1* | 8/2007 | Nagami et al. | 370/252 |
| 2007/0180448 A1* | 8/2007 | Low et al. | 718/1 |
| 2007/0180450 A1* | 8/2007 | Croft et al. | 718/1 |
| 2007/0186212 A1* | 8/2007 | Mazzaferri et al. | 718/1 |
| 2007/0220121 A1* | 9/2007 | Suwarna | 709/220 |
| 2008/0046890 A1* | 2/2008 | Dunlap et al. | 718/104 |
| 2008/0104608 A1* | 5/2008 | Hyser et al. | 718/105 |
| 2008/0141048 A1* | 6/2008 | Palmer et al. | 713/300 |
| 2008/0141264 A1* | 6/2008 | Johnson | 718/105 |
| 2008/0184229 A1* | 7/2008 | Rosu et al. | 718/1 |
| 2009/0088192 A1* | 4/2009 | Davis et al. | 455/466 |
| 2009/0106571 A1* | 4/2009 | Low et al. | 713/310 |
| 2009/0193436 A1* | 7/2009 | Du et al. | 719/318 |
| 2009/0265707 A1* | 10/2009 | Goodman et al. | 718/1 |
| 2010/0077401 A1* | 3/2010 | Brant et al. | 718/104 |
| 2010/0131639 A1* | 5/2010 | Narayana et al. | 709/224 |
| 2010/0262974 A1* | 10/2010 | Uyeda | 718/105 |
| 2010/0274890 A1* | 10/2010 | Patel et al. | 709/224 |
| 2010/0325251 A1* | 12/2010 | Beppu | 709/221 |
| 2011/0019531 A1* | 1/2011 | Kim et al. | 370/216 |
| 2011/0078303 A1* | 3/2011 | Li et al. | 709/224 |
| 2011/0131323 A1* | 6/2011 | Otsuka et al. | 709/224 |
| 2011/0131448 A1* | 6/2011 | Vasil et al. | 714/19 |
| 2011/0153840 A1* | 6/2011 | Narayana et al. | 709/227 |
| 2011/0225017 A1* | 9/2011 | Radhakrishnan | 705/7.25 |
| 2011/0314470 A1* | 12/2011 | Elyashev et al. | 718/1 |
| 2012/0036515 A1* | 2/2012 | Heim | 718/105 |
| 2012/0109852 A1* | 5/2012 | Lingam et al. | 705/400 |
| 2012/0124576 A1* | 5/2012 | Chiaramonte et al. | 718/1 |
| 2012/0173709 A1* | 7/2012 | Li et al. | 709/224 |
| 2012/0179800 A1* | 7/2012 | Allan et al. | 709/223 |
| 2012/0204176 A1* | 8/2012 | Tian et al. | 718/1 |
| 2012/0254437 A1* | 10/2012 | Hirschfeld et al. | 709/226 |
| 2013/0227134 A1* | 8/2013 | West, III | 709/224 |
| 2014/0052864 A1* | 2/2014 | Van Der Linden et al. | 709/226 |

FOREIGN PATENT DOCUMENTS

| | | |
|---|---|---|
| CN | 1920745 | 8/2006 |
| CN | 100426771 C | 2/2007 |
| CN | 101473306 | 6/2007 |
| WO | WO 2007/149224 | 12/2007 |

OTHER PUBLICATIONS

PCT, Invitation to Pay Additional Fees and, Where Applicable, Protest Fee, Annex to Form PCT/ISA/206, Communication Relating to the Results of the Partial International Search, International Application No. PCT/US2010/051735, 8 pages, Jan. 31, 2011.

(56) References Cited

OTHER PUBLICATIONS

U.S. Appl. No. 12/431,546 entitled "*Methods and Apparatus to Get Feedback Information in Virtual Environment for Server Load Balancing*" by Alpesh Patel et al, specification, claims, and abstract—23 pages, drawings—7 pages, filed Apr. 28, 2009.

PCT Notification of Transmittal of the International Search Report and the Written Opinion of the International Searching Authority, or the Declaration with attached PCT International Search Report and the Written Opinion of the International Searching Authority in International Application No. PCT/US2010/051735, dated Jul. 20, 2011, 19 pages, Jul. 20, 2011.

The First Office Action from the State Intellectual Property Office of the People's Republic of China in Application No. 201080049096.0, dated Apr. 29, 2014 (with translation), 12 pages, Apr. 29, 2014.

The Second Office Action in China Application No. 201080049096.0, dated Nov. 21, 2014, 6 pages, Nov. 21, 2014.

\* cited by examiner

FIG. 2

BALANCING SERVER LOAD ACCORDING TO AVAILABILITY OF PHYSICAL RESOURCES BASED ON THE DETECTION OF OUT-OF-SEQUENCE PACKETS

TECHNICAL FIELD

The present disclosure relates generally to computer systems.

BACKGROUND

In certain situations, servers may operate on virtual machines running on physical machines. A server on a virtual machine may report performance metrics of the virtual machine to a load balancer. The load balancer may use the performance metrics to determine how to distribute load among the servers.

DESCRIPTION OF EXAMPLE EMBODIMENTS

Overview

According to one embodiment, availability information describing virtual machines running on physical machines is accessed. The availability information associates each virtual machine with a physical resource used by the virtual machine. Use by the virtual machines is determined from the availability information. Availability of the physical resources is determined according to the use. Server load is balanced according to the availability of the physical resources. According to another embodiment, the following is performed until a load is accommodated: selecting a server having a load that is less than an expansion threshold; loading the server until the expansion threshold is reached; selecting a next server having a load that is less than a next expansion threshold; and loading the next server until the next expansion threshold is reached. Load of a low load server is determined to be below a contraction threshold, and the low load server is drained. In certain embodiments, load may be concentrated on a smaller number of virtual machines, which may result in more efficient resource allocation.

Description

Figure 1:
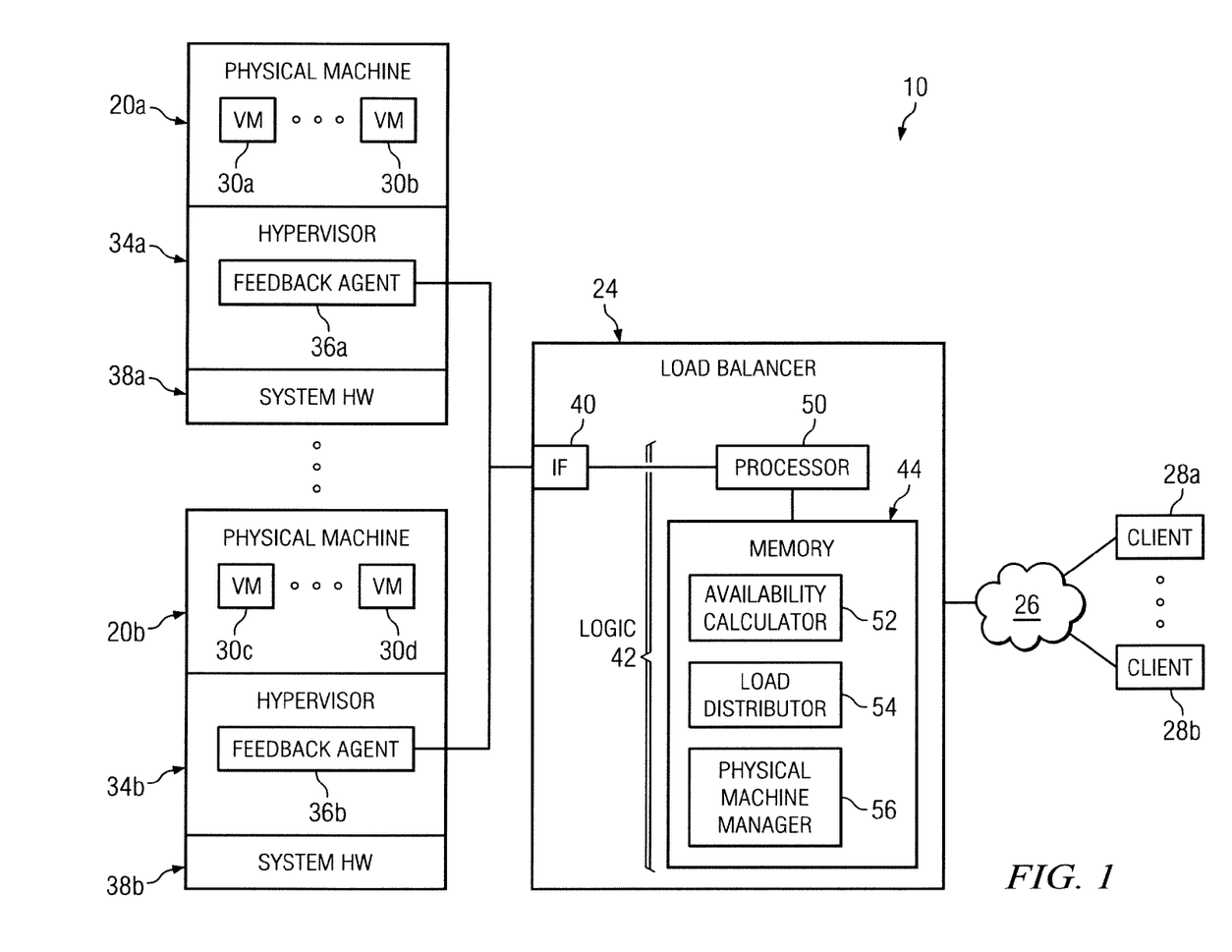
FIG. 1 illustrates an example of a system for balancing server load by taking into account availability of physical resources.

FIG. 1 illustrates an example of a system 10 for balancing server load by taking into account availability of physical resources. In certain embodiments of operation, system 10 accesses availability information describing virtual machines running on physical machines. The virtual machines use physical resources. In the embodiments, system 10 determines use by the virtual machines from the availability information and availability of the physical resources according to the use by the virtual machines. In the embodiments, system 10 balances server load according to the availability of the physical resources.

In certain embodiments of operation, system 10 balances server load of servers of the virtual machines by performing the following until a load is accommodated: selecting an available server with a load that is less than an expansion threshold; loading the available server until the expansion threshold is reached; selecting a next available server with a load that is less than an expansion threshold; and loading the next available server until the expansion threshold is reached. In the embodiments, system 10 determines that load of a low server of the set of servers is below a contraction threshold and the drains the low server.

In the illustrated embodiment, system 10 includes one or more physical machines 20 (20*a*, . . . , 20*b*), a load balancer 24, a communication network 26, and/or one or more clients 28 (28*a*, 28*b*) coupled as shown. A physical machine 20 may support one or more virtual machines 30 (30*a*, . . . , 30*d*), and may include a hypervisor 34 (34*a*, 34*b*), a feedback agent 36 (36*a*, 36*b*), and/or system hardware (HW) 38 (38*a*, 38*b*). Load balancer 24 may include an interface (IF) 40, logic 42, and/or one or more memories 44. Logic 42 may include one or more processors 50 and software such as an availability calculator 52, a load distributor 54, and/or a physical machine manager 56.

Physical machine 20 may be any suitable computing system that can support virtual machines 30. Examples of physical machine 20 include physical servers of a data center or a server center. A physical machine 20 may be partitioned into two or more virtual machines 30. In certain embodiments, a virtual machine 30 may be assigned or configured with a network layer address (e.g., an IP address). In certain embodiments, a particular virtual machine 30 may manage other virtual machines 30.

A virtual machine 30 may support a server, such that the server has the appearance and capabilities of running on its own dedicated machine. A server may be identified by a network address and/or port of machine 20 or 30. A server on a virtual machine 30 receives a request sent from a requesting client 28 and forwarded by load balancer 24. The server generates a response to the request, which is sent back to the requesting client 28. A server that is processing load may be regarded as an active server, a server that is not currently processing load but is ready to may be regarded as an idle server, and a server on a physical machine that is in a power saving mode (such as in a power off mode) may be regarded as an powered off server.

In certain embodiments, a server may have one or more thresholds that indicate to load balancer 24 when to or when not to load (such a forward a request to) the server. For example, an expansion threshold indicates when the server is reaching capacity and should not have any additional load. The expansion threshold may have any suitable value, for example, such as 80 to 90 percent, or greater than 90 percent of capacity. Load balancer 24 may then distribute any additional load to another server. A contraction threshold indicates when the server is reaching an unused state and may soon have no load. Load balancer 24 may then start to drain the server. The contraction threshold may have any suitable value, for example, such as 10 to 20 percent, or less than 10 percent of capacity. In certain embodiments, the expansion and contraction thresholds may straddle a spread of capacity utilization to avoid thrashing.

The expansion and contraction thresholds may be measured in any suitable manner, for example, using open connections or CPU load. The thresholds may be configured on a server and/or may be dynamically calculated from availability information, including performance metrics. For example, a threshold may be calculated from a function applied to values of availability information.

System hardware 38 may be physical hardware of physical machine 20, and may be regarded as physical resources of physical machine 20. System hardware 38 may include, for example, one or more interfaces (e.g., an network interface), one or more integrated circuits (ICs), one or more storage devices (e.g., a memory or a cache), a network interface controller (NIC), and/or one or more processing devices (e.g., a central processing unit (CPU)).

Hypervisor 34 may run system hardware 38 to host and execute virtual machines 30. In certain embodiments, hypervisor 34 may allocate use of system hardware 38 to a virtual machine 30. The allocated hardware may be regarded as virtual resources of the virtual machine 30. In certain embodiments, one or more components of system hardware 38 may be shared among two or more virtual machines 30 operating on physical machine 20.

Feedback agent 36 may monitor the availability of physical machines 20 and virtual machines 30 to obtain availability information describing the availability of physical machines 20 and virtual machines 30. Feedback agent 36 may send the availability information, as well as other information, to load balancer 24. In other embodiments, each server may report its own availability. Availability information may be sent using any suitable protocol, for example, Dynamic Feedback Protocol (DFP), Keep Alive-Access Protocol (KALAP), or Webcache Communication/Control Protocol (WCCP).

In one example of operation, load balancer 24 obtains availability information, which may indicate one or more resources (such as one or more physical machines 20) used by a particular virtual machine 30. Load balancer 24 determines use by virtual machines 30 and availability of the physical resources according to the use by virtual machine 30. Load balancer 24 then balances server load, such as computing tasks, according to the availability of the physical resources. Load balancer 24 may perform the operations described herein automatically, without human intervention.

Examples of a physical resource include a physical machine 20 itself, as well as a resource within a physical machine 20, such as front end or back end link. Other examples of a physical resource include a network resource shared by two or more physical machines 20, such as a link used by one or more physical machines 20 or a link between one or more physical machines 20 and load balancer 24.

A physical resource may have a capacity above which the resource can no longer satisfactorily handle additional work and/or at which additional work should not be accepted. As an example, a physical machine 20 may have a machine capacity indicating the amount of work that physical machine 20 can handle. Similarly, a resource of a physical machine 20 may have a resource capacity, and a network resource may have a network resource capacity. The capacity may be defined by a threshold. In certain embodiments, the threshold may be set at a value lower than the actual capacity to allow for error and/or delay in determining when a capacity is reached.

In certain embodiments, a virtual machine 30 may have an allotted capacity of a physical resource that indicates the portion of the capacity of the physical resource that the virtual machine 30 is allowed to use. For example, a first virtual machine 30a may have a first allotted capacity of a physical resource, and a second virtual machine 30a may have a second allotted capacity of the physical resource. The allotted capacities may be weighted in any suitable manner, such as equivalently or non-equivalently among the virtual machines 30.

Availability calculator 52 of load balancer 24 calculates the availability of resources from the availability information. Availability information may include any suitable information that may be used to determine use and/or availability of physical machines 20, virtual machines 30, and/or resources. In certain embodiments, availability information may include information from which load balancer 24 may calculate use and/or availability. For example, availability information may include performance metrics that include factors that affect the performance of a machine. Performance metrics may describe features of (such as the load on, usage of, or performance of) the machine itself or resources of the machine (such as hardware of the machine or hardware allocated to the machine). For example, a performance metric may describe a total current load of a machine.

In certain embodiments, performance metrics may include virtual performance metrics that describe the performance of virtual machines 30 and one or more physical performance metrics that describe the performance of physical machine 20. In certain embodiments, the virtual performance metrics may be normalized according to the physical performance metrics. For example, virtual performance metrics of a virtual machine 30 may be provided with respect to the physical resource allotted to the virtual machine 30. As an example, a virtual machine 30 may be allotted one-half of a bandwidth. As virtual machine 30 use approaches the allocated bandwidth, the virtual performance metric may approach 100% usage.

In certain embodiments, load balancer 24 may normalize the availability of a virtual machine according to physical resources. As an example, load balancer 24 may determine the availability of a virtual machine 30 based on the allotted resources of the virtual machine 30. As another example, load balancer 24 may take the availability as the lower of two available metrics. A first metric may describe session counts and CPU utilization, and a second metric may describe factors that impact data access times. The normalized availability may be taken as a function of the metrics.

Availability calculator 52 may obtain availability information in any suitable manner. In certain embodiments, availability calculator 52 may receive availability information from feedback agent 36 and/or servers, and may monitor the availability information by monitoring the physical resources. For example, availability calculator 52 may send out active probes to monitor the resource or may watch for anomalies, such as out-of-sequence packets that indicate that network resources are being taxed.

In certain embodiments, a physical resource may be considered as unavailable if use by virtual machines 30 of a physical resource reaches a capacity of the physical resource. The use may reach the capacity if the use is at or greater than a threshold that defines the capacity.

Availability information may indicate a change that affects the calculation of the availability of resources. For example, availability information may include a migration status of a virtual machine, which indicates that the virtual machine 30 has moved from one physical machine 20a to another physical machine 20b. As another example, availability information may include a report that an application has been added to or deleted from physical machine 20.

Load distributor 54 distributes server load according to availability. As an example, if use by the set of first virtual machines 30a, . . . , 30b is reaching a machine capacity of the first physical machine 20a or a resource capacity of a resource of the first physical machine 20a, load balancer 24 distributes load to one or more virtual machines 30c, . . . , 30d running on a physical machine 20b other than first physical machine 20a.

As another example, if use by each first virtual machine 30a, ..., 30b is reaching a capacity allotted to the virtual machine 30a, ..., 30b, load balancer 24 distributes load to one or more virtual machines 30c, ..., 30d running on a physical machine 20b other than first physical machine 20a. As another example, if the set of first virtual machines 30a, ..., 30b is reaching capacity of a network resource shared by first physical machine 20a and second physical machine 20b, load balancer 24 distributes load to one or more virtual machines 30c, ..., 30d running on a physical machine 20 other than first physical machine 20a or the second physical machine 20b.

Physical machine manager 56 places physical machines 20 in an operational mode (such as a power on mode) or a power saving mode (such as a dormant or power off mode). A server on a physical machine 20 in an operational mode can process load, but a server on a physical machine 20 in a power saving mode cannot process load. A physical machine 20 in a power saving mode uses less power and/or costs less to use that a physical machine 20 in an operational mode. Physical machine manager 56 may make sure that there is no load directed at a physical machine 20 before placing the physical machine 20 into a power saving mode.

Physical machine manager 56 place physical machine 20 into the modes in any suitable manner. For example, physical machine manager 56 may send a signal (such as a TCL telnet shutdown now or Simple Network Management Protocol (SNMP) message) to a server or a server management system to place physical machine 20 into a power saving mode. As another example, physical machine manager 56 may instruct an external management system, for example, a data center, to place physical machine 20 into a power saving mode. As another example, physical machine manager 56 may use wake on LAN or signals in a management node to place physical machine 20 into an operational mode.

In certain embodiments, physical machine manager 56 may operate to maintain a predetermined number of idle servers, that is, servers that are not currently processing load but are ready to do so. In the embodiments, if there are too few idle servers (e.g., all powered on servers are active), physical machine manager 56 may power on an additional server to operate as an idle server ready to process load. If there are too many idle servers, physical machine manager 56 may power off an idle server.

The predetermined number of idle servers may be any appropriate number, such as one, two, three, or more idle servers. The number of idle servers may be configurable and may be adjusted to accommodate changing conditions. For example, if there is an anticipated increased use of the servers at a particular time (designated by time and/or day), the number may be increased. Similarly, if there is an expected decrease use of the servers, the number may be decreased.

Client 28 represents any suitable component operable to request an offering (such as information or a service) from a server. Examples of client 28 include one or more computers (e.g., a personal computer, a server, a computing system, a network, and a personal digital assistant), a telephone (e.g., a wired and/or wireless telephone), or any other device operable to communicate with system 10.

Figures 2, 3:
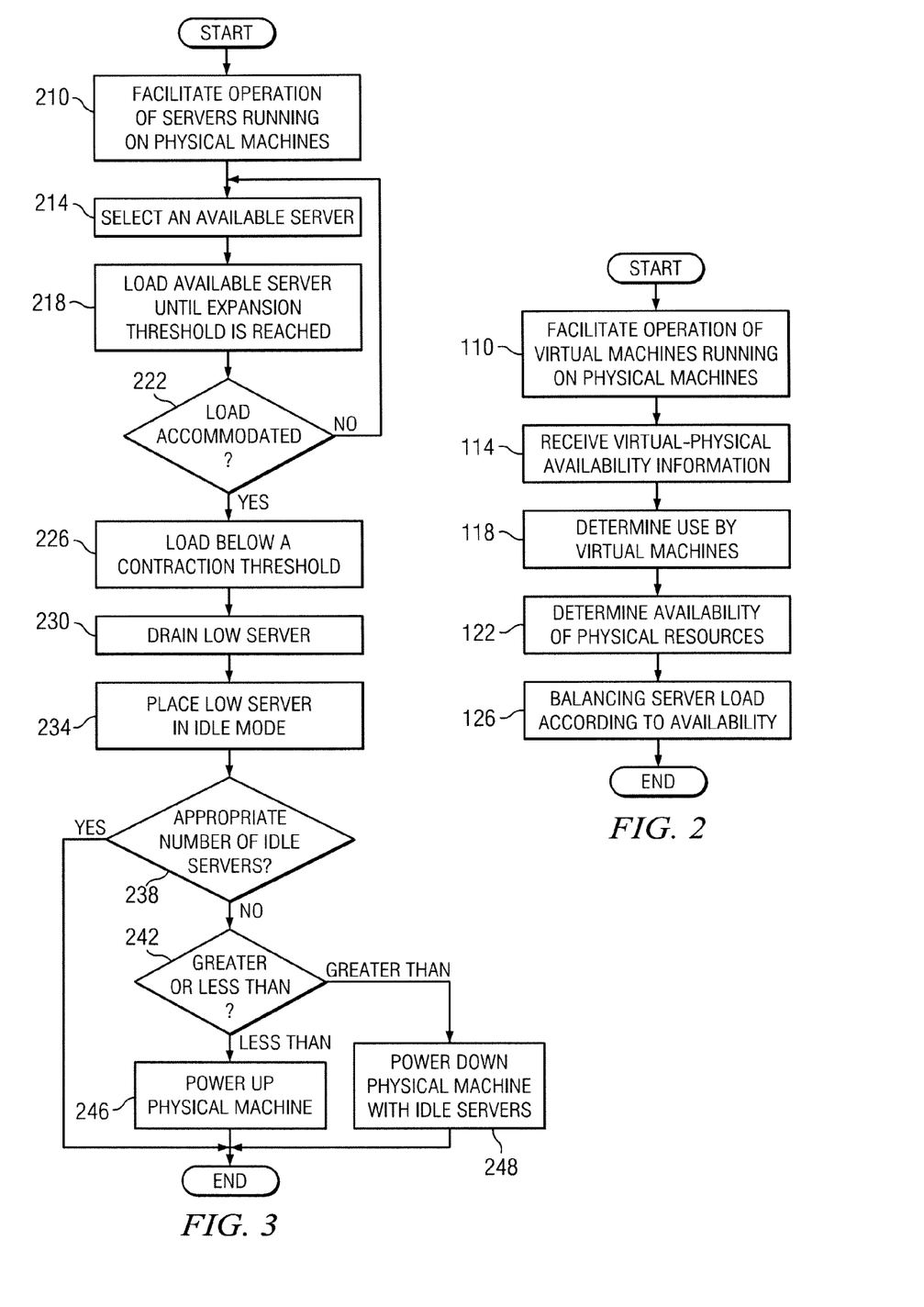
FIG. 2 illustrates an example of a method for determining availability of physical resources by virtual machines.
FIG. 3 illustrates an example of a method for distributing load.

FIG. 2 illustrates an example of a method for determining availability of physical resources by virtual machines 30. Load balancer 24 facilitates operation of virtual machines 30 running on one or more physical machines 20 at step 110. Virtual machines 30 use one or more physical resources. Availability information describing availability of virtual machines 30 and physical machines 20 is received at step 114. The availability information may include performance metrics, and may indicate that a set of first virtual machines 30a-30b is running on a first physical machine 20a.

In certain embodiments, load balancer 24 may adjust its estimate of the capacity of a resource. As an example, if an added technology has been deployed on a physical machine 20, the estimate of the capacity of physical machine 20 may be decreased to account for the added technology. As another example, if a technology has been removed from a physical machine 20, the estimate of the capacity of physical machine 20 may be increased to account for the removed technology. As another example, if a first virtual machine 30a has been moved to from the first to a second physical machine 20b, the estimate of the capacity of first physical machine 20a may be increased and the estimate of the capacity of second physical machine 20b may be decreased to account for the movement.

Use of resources by virtual machines 30 is determined from the availability information at step 118. The use of resources may be determined from the performance metrics. Availability of the physical resources is determined from the use by virtual machines 30 at step 122. For example, a physical resource may be considered as unavailable if use by virtual machines 30 of a physical resource reaches a capacity of the physical resource. The use may reach the capacity if the use is at or greater than a threshold that defines the capacity.

The server load is distributed according to the availability at step 126. As an example, if use by the set of first virtual machines 30a-30b is reaching a machine capacity of first physical machine 20a or a resource capacity of a resource of first physical machine 20a, the load balancer 24 distributes load to one or more virtual machines 30c-30d running on a physical machine 20b other than first physical machine 20a.

FIG. 3 illustrates an example of a method for distributing load that may decrease power usage. Load balancer 24 facilitates operation of active servers running on physical machines 20 at step 210. An available server with a load that is less than an expansion threshold of the server is selected at step 214. The expansion threshold may be a load at which load balancer 24 begins sending connections to another server to add the other server to the set of active servers.

At step 218, the available server is loaded until the expansion threshold of the server is reached. Load balancer 24 may load the server by assigning one or more new connections to the server. The load may be accommodated, for example, there may be no more connections to assign, at step 222. If the load has not been accommodated, the method returns to step 214, where a next available server is selected. If the load has been accommodated, the method proceeds to step 226.

The load of a server is determined to be below a contraction threshold of the server at step 226. The contraction threshold is a load at which the load balancer begins draining a server of connections. The low load server is drained at step 230 to place the server in an idle mode at step 234. Load balancer 24 may drain the server by ceasing to assign any new connections to the low server. In certain embodiments, load balancer 24 may contract the active server slowly and continually monitor the load to avoid overloading another server.

There may be an appropriate number of idle servers at step 238. Load balancer 24 may operate to maintain the number of idle servers at an appropriate number, such as one, two, three, or more idle servers. If there is an appropriate number, the method ends. If there is not an appropriate number, the method proceeds to step 242. The number of idle servers may be greater than or less than the appropriate number at step 242.

If the number of idle servers is less than the appropriate number, a physical machine 20 of one or more of the servers is powered up at step 246 to increase the number of the servers in an idle mode to the appropriate number. If the number of idle servers is greater than the appropriate number, a physical machine of one or more of the servers in an idle mode is placed in a power saving mode at step 248 to reduce the number of idle servers to the appropriate number. A power saving mode may decrease the power consumption of physical machine 20. Load balancer 24 may check to see that a physical machine 20 having only idle servers is powered down. In certain embodiments, load balancer 24 may migrate active servers away from a physical machine 20 in order to free up a physical machine 20. If there is an appropriate number of idle servers at step 238, the method ends.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

The systems, apparatuses, and methods disclosed herein may utilize communication protocols and technologies to provide the communication sessions. Examples of communication protocols and technologies include those set by the Institute of Electrical and Electronics Engineers, Inc. (IEEE) 802.xx standards, the International Telecommunications Union (ITU-T) standards, the European Telecommunications Standards Institute (ETSI) standards, the Internet Engineering Task Force (IETF) standards, or other standards.

Modifications, additions, or omissions may be made to the systems, apparatuses, and methods disclosed herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. The methods may include more, fewer, or other steps. Additionally, steps may be performed in any suitable order. As used in this document, "each" refers to each member of a set or each member of a subset of a set. A set may include zero, one, or more elements. A subset of a set may include zero, one, two or more, or all elements of the set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:

accessing availability information describing a plurality of virtual machines running on one or more physical machines, wherein a virtual machine has associated virtual machine performance metrics and a physical machine has associated physical machine performance metrics, the virtual machine performance metrics comprise partial usage and load measurements of hardware, software, and network resources corresponding to the resource consumption of the virtual machine, physical machine performance metrics comprise full usage and load measurements of hardware, software, and network resources corresponding to the physical machine, the availability information being based on the virtual machine performance metrics and the physical machine performance metrics, the plurality of virtual machines using one or more physical resources, the availability information associating each virtual machine with a corresponding physical resource used by the each virtual machine, and wherein accessing availability information comprises:

receiving, at an interface of a load balancer, availability information from the one or more physical machines and availability information from one or more hypervisors associated with one or more virtual machines of the plurality of virtual machines; and monitoring, by one or more processors of the load balancer, the physical resources used by the plurality of virtual machines by actively sending monitor probes to the physical resources to detect out-of-sequence packets indicating that the resource is taxed;

determining, by one or more processors of the load balancer, use by the plurality of virtual machines from the availability information;

determining, by one or more processors of the load balancer, availability of the one or more physical resources according to the use by the plurality of virtual machines;

balancing server load according to the availability of the one or more physical resources based at least in part on the detection of out-of-sequence packets;

determining an expansion threshold for one or more physical resources based at least in part on the detection of out-of-sequence packets, wherein the load balancer does not send connections to the one or more physical resources at the expansion threshold; and determining a contraction threshold for one or more physical resources based at least in part on the detection of out-of-sequence packets, wherein the load balancer drains the load from the one or more physical resources at the contraction threshold.

2. The method of claim 1:
the determining availability of the one or more physical resources further comprising:
  determining, by one or more processors of the load balancer, that use by a set of first virtual machines running on a first physical machine is reaching capacity; and
the balancing server load according to the availability further comprising:
  distributing, by one or more processors of the load balancer, load to one or more virtual machines running on a second physical machine distinct from the first physical machine.

3. The method of claim 1:
the determining availability of the one or more physical resources further comprising:
  determining, by one or more processors of the load balancer, use by a set of first virtual machines running on a first physical machine is reaching capacity of a resource of the first physical machine; and
the balancing server load according to the availability further comprising:
  distributing, by one or more processors of the load balancer, load to one or more virtual machines running on a second physical machine distinct from the first physical machine.

4. The method of claim 1:
the determining availability of the one or more physical resources further comprising:
  establishing, by one or more processors of the load balancer, that a technology has been deployed on or removed from a physical machine; and
  adjusting, by one or more processors of the load balancer, an estimate of the capacity of the physical machine to account for the deployed or removed technology.

5. The method of claim 1:
the determining availability of the one or more physical resources further comprising:
  establishing, by one or more processors of the load balancer, that a virtual machine has been moved from a first physical machine to a second physical machine; and
  adjusting, by one or more processors of the load balancer, a first estimate of the capacity of the first machine and a second estimate of the capacity of the second machine to account for the movement.

6. An apparatus comprising:
a memory configured to store computer executable instructions; and
one or more processors coupled to the memory, the processors configured, when executing the instructions, to:
  access availability information describing a plurality of virtual machines running on one or more physical machines, wherein a virtual machine has associated virtual machine performance metrics and a physical machine has associated physical machine performance metrics, the virtual machine performance metrics comprise partial usage and load measurements of hardware, software, and network resources, the usage and load measurements corresponding to the resource consumption of the virtual machine, physical machine performance metrics comprise full usage and load measurements of a plurality of hardware, software, and network resources corresponding to the physical machine, the availability information based on the virtual machine performance metrics and the physical machine performance metrics, the plurality of virtual machines using one or more physical resources, the availability information associating each virtual machine with a corresponding physical resource used by the each virtual machine, and wherein accessing availability information comprises:
    receiving availability information from the one or more physical machines and availability information from one or more hypervisors associated with one or more virtual machines of the plurality of virtual machines; and
    monitoring the physical resources used by the plurality of virtual machines by actively sending monitor probes to the physical resources to detect out-of-sequence packets indicating that the resource is taxed;
  determine use by the plurality of virtual machines from the availability information;
  determine availability of the one or more physical resources according to the use by the plurality of virtual machines;
  balance server load according to the availability of the one or more physical resources based at least in part on the detection of out-of-sequence packets;
  determine an expansion threshold for one or more physical resources based at least in part on the detection of out-of-sequence packets, wherein the load balancer does not send connections to the one or more physical resources at the expansion threshold; and
  determine a contraction threshold for one or more physical resources based at least in part on the detection of out-of-sequence packets, wherein the load balancer drains the load from the one or more physical resources at the contraction threshold.

7. The apparatus of claim 6:
the determining availability of the one or more physical resources further comprising:
  determining that use by a set of first virtual machines running on a first physical machine is reaching capacity; and
the balancing server load according to the availability further comprising:
  distributing load to one or more virtual machines running on a second physical machine distinct from the first physical machine.

8. The apparatus of claim 6:
the determining availability of the one or more physical resources further comprising:
  determining use by a set of first virtual machines running on a first physical machine is reaching capacity of a resource of the first physical machine; and
the balancing server load according to the availability further comprising:
  distributing load to one or more virtual machines running on a second physical machine distinct from the first physical machine.

9. The apparatus of claim 6:
the determining availability of the one or more physical resources further comprising:
  establishing that a technology has been deployed on or removed from a physical machine; and
  adjusting an estimate of the capacity of the physical machine to account for the deployed or removed technology.

10. The apparatus of claim 6:
the determining availability of the one or more physical resources further comprising:
  establishing that a virtual machine has been moved from a first physical machine to a second physical machine; and
  adjusting a first estimate of the capacity of the first machine and a second estimate of the capacity of the second machine to account for the movement.

* * * * *